United States Patent [19]
Takeuchi et al.

[11] Patent Number: 5,107,383
[45] Date of Patent: Apr. 21, 1992

[54] TRANSDUCER SUPPORTING DEVICE FOR SUPPORTING A TRANSDUCER IN A ROTARY DISK STORAGE UNIT

[75] Inventors: Yoshinori Takeuchi, Ishioka; Yuzo Yamaguchi, Tsuchiura; Taichi Sato, Ishioka; Hiroshi Daito, Kanagawa; Marutomo Goto, Ibaraki, all of Japan

[73] Assignee: Hitachi, Ltd., Tokyo, Japan

[21] Appl. No.: 408,726

[22] Filed: Sep. 18, 1989

[30] Foreign Application Priority Data

Sep. 20, 1988 [JP] Japan .................. 63-235290

[51] Int. Cl.⁵ .................. G11B 5/58; G11B 21/16
[52] U.S. Cl. .................................................. 360/104
[58] Field of Search ........................................ 360/104

[56] References Cited

U.S. PATENT DOCUMENTS

| | | | |
|---|---|---|---|
| 4,167,765 | 9/1979 | Watrovs | 360/104 |
| 4,796,122 | 1/1989 | Levy et al. | 360/104 |
| 4,829,395 | 5/1989 | Coon et al. | 360/104 |
| 4,868,694 | 9/1989 | Hagen | 360/104 |
| 4,884,154 | 11/1989 | Onodera et al. | 360/104 |
| 4,912,583 | 3/1990 | Hinlein | 360/104 |

*Primary Examiner*—Robert S. Tupper
*Attorney, Agent, or Firm*—Antonelli, Terry, Stout & Kraus

[57] ABSTRACT

A transducer supporting device having a rigid-structure support member connected to a guide arm, and a flexible-structure support member attached to the rigid-structure support member on the side of a free end of the same. Portions of the rigid-structure and flexible-structure support members connected to each other are constructed so that the shear center of these portions is brought closer to the connection surface.

1 Claim, 6 Drawing Sheets

TRANSDUCER SUPPORTING DEVICE FOR SUPPORTING A TRANSDUCER IN A ROTARY DISK STORAGE UNIT

BACKGROUND OF THE INVENTION

This invention relates to a device for supporting transducer for use in rotary disk type storage unit and, more particularly, to a transducer supporting device in which the clearance between the transducer and the recording surface (hereinafter referred to as "floating clearance") is limited and which is suitable for a high-density storage unit improved in seek speed.

Ordinary rotary disk type storage units have a type of construction, such as the one disclosed in Japanese Patent Examined Publication No. 58-22827, which consists of a rotatable storage medium, a transducer for reading information from the storage medium or writing information thereon while being slightly spaced apart therefrom, a device for supporting the transducer, and an accessing mechanism for making the transducer reach the desired radial position on the storage medium and maintaining the transducer at the same position.

The transducer supporting device is provided with a flexible-structure member having a rectangular cutout formed with a pair of flexible outer extensions connected by a low-flexibility transverse portion, and a flexible central tongue-like portion extending from the transverse portion toward the cutout; a rigid-structure support member having a resilient portion and a load beam portion and supporting the flexible-structure support member; and a load projection disposed between the rigid-structure support member and the central tongue-like portion of the flexible-structure support member. The transducer supporting device is connected by a rigid guide arm to the accessing mechanism. An air bearing slider (hereinafter referred to simply as "slider") is attached to the central tongue-like portion of the flexible-structure support member. The load beam portion has flanges formed along its two sides facing each other in the widthwise direction perpendicular to the longitudinal direction of the supporting device, with the flanges extending in the longitudinal direction of the supporting device. The load beam portion has a shape of flattened U in transverse cross section. The combination of the rigid-structure support member and the flexible-structure support member connected to the former is called a support spring.

During seeking for accessing of the transducer at a desired radial position on the rotating storage medium, a driving force is applied from the accessing mechanism to the transducer supporting device in the radial direction of the storage medium. The transducer supporting device is accelerated, maintained at a constant speed or decelerated by this driving force.

Shaking forces are produced during seeking due to the structure of the accessing mechanism. These forces, including those applied in the seeking direction, are introduced into the transducer supporting device via the guide arm.

As stated below, the above-described type of conventional transducer supporting device was designed without giving sufficient consideration to the occurrence of changes in the slider floating clearance caused by vibrations of the transducer supporting device based on the natural vibration mode of the structure thereof when, during seeking, shaking forces due to the driving force and the accessing mechanism are applied.

That is, conventionally, this phenomenon cannot be sufficiently considered by lack of means for accurately measuring changes in the floating clearance with respect to time at a high speed and, hence, means for simultaneously measuring changes in the floating clearances at the front and rear ends of the left and right floating surfaces of the slider to detect pitching and rolling motions of the slider. What is meant by high-speed and high-accuracy measurement of changes in the floating clearances are measuring changes in the floating clearance of about 0.01 $\mu$m occurring in a period of time of 0.2 ms with resolutions of 0.05 to 0.1 ms and 0.001 $\mu$m or higher.

The second reason for the insufficiency of consideration of changes in the floating clearance during seeking is that the floating clearance has been considered to be sufficiently large compared with calculated changes during seeking. That is, the variation of the floating clearance in the conventional arrangement has been considered to be 0.01 to 0.03 $\mu$m and has not been regarded as any serious cause of malfunctions. However, with increase in the storage density achieved recently, a need for reducing the floating clearance to 0.2 to 0.3 mm has arisen. On the other hand, it is considered that the seek speed will be increased for reduction in the access time and that the variation of the floating clearance during seeking will become larger. It is therefore necessary to sufficiently consider the problem of changes in the floating clearance during seeking.

A type of transducer supporting device in which the center axis of a load beam portion is perpendicular to the center line of slider floating rails will be described below for explanation of causes of changes in the floating clearance during seeking.

During seeking, a driving force is applied in the radial direction from the accessing mechanism to the transducer supporting device through the guide arm. Simultaneously, shaking forces including those in directions other than the driving direction are produced from moving contact portions such as traveling surfaces of the accessing mechanism and are applied to the transducer supporting device through the guide arm like the driving force. These forces excite the natural vibration modes of the accessing mechanism and the guide arm so that shaking forces other than the shaking force in the seeking direction are applied from the transducer supporting device attachment portion of the arm to the transducer supporting device in various directions including two directions perpendicular to the transducer supporting device and rotational directions. As a result, the natural vibration modes of the transducer supporting device are excited so that the slider is displaced to change the floating clearance by vibrations of the transducer supporting device. Conventionally, among the natural vibration modes of the transducer supporting device, out-plane bending and out-plane torsional vibration modes are known and means for suppressing them have been studied. However, it has been found that, apart from these modes, in-plane bending modes are excited during seeking, thereby causing large changes in the floating clearance. In these modes, the extreme end of the transducer supporting device (at which the slider is mounted) vibrates parallel to the medium surface.

Specifically, the rigid-structure support member of the conventional transducer supporting device is formed of a thin member, and the load beam portion is in the form of a channel-section member having a cross-sectional shape of flattened U and having flanges formed along its two opposite sides. The shear center of such a thin channel-section member in a transverse cross section is located remote from the bottom of the channel cross section. For this reason, the rigid-structure support member torsionally vibrates if it vibrates in the in-plane modes, thereby applying forces in the vibrating directions and torsional moments to the flexible-structure member. Consequently, these shaking forces cause pitching of the slider and, hence, large changes in the floating clearance.

As described above, conventional transducer supporting devices have been designed without giving sufficient consideration to the fact that the shear center of the rigid-structure support member in a transverse cross section is remote from the rigid-structure support member with respect to in-plane vibration modes of the same, and therefore entails the problems of the floating clearance variation being larger during seeking.

In the case of an in-line type transducer supporting device in which the center axis of the load beam portion and the center line of the slider floating rails are parallel to each other, the driving force applied form the accessing mechanism in the radial direction during seeking directly excites in-plane bending modes of the rigid-structure support member so that torsions about the shear center are large, because shaking forces are large with respect to the same shear center, resulting in increased changes in the slider floating clearance. The in-line type device therefore entails the problem of displacements of the slider in off-track directions due to rolling thereof as well as the problem of changes in the floating clearance.

SUMMARY OF THE INVENTION

It is an object of the present invention to provide an improved transducer supporting device by reducing changes in the floating clearance for the transducer mounting means during seeking and, hence, the possibility of contact between the transducer mounting means and the storage medium.

It is another object of the present invention to provide a rotary disk storage unit which incorporates this transducer supporting device and in which the reliability relating to writing of information on the storage medium and reading of information from the storage medium is improved.

In accordance with the present invention, there is provided a device for supporting a transducer, comprising a rigid-structure support member having a resilient portion and a load beam portion connected to the resilient portion; a flexible-structure support member connected to the load beam portion while overlapping the same; and a transducer mounting means attached to the flexible-structure support member; wherein connection portions of the rigid-structure and flexible-structure support members connected to each other are constructed in such a manner that the shear center of the rigid-structure support member in a transverse cross section perpendicular to the longitudinal direction of the rigid-structure support member taken at the connection portions is brought closer to the plane in which the connection portions are connected to each other.

During seeking, vibrations of in-plane bending modes of the rigid-structure support member are caused by the seek speed in the portion of the rigid-structure support member connected to the flexible-structure support member, thereby causing torsion. An angular moment based on this torsion is applied to the rigid-structure support member along with other forces. This angular moment due to the torsion is proportional to the distance between the connection plane and the shear center of the rigid-structure support member in a transverse cross section about the center line of the same. It is possible to prevent limit the torsion and, hence, the angular moment by bringing the shear center closer to the connection plane.

It is thereby possible to reduce changes in the slider floating clearance during seeking.

If a rigid-structure support member having a channel section and a flexible-structure support member also having a channel section are connected to other in an overlapping manner, the shear centers of these members are located on the opposite sides of the connection and cancel each other so that the shear center of the combined structure is closer to the connection plane compared with that of each support member.

In the channel section structure, the distance between the shear center and the bottom side of the channel shape is smaller if the height of the channel shape is smaller and if the distance between the flanges is smaller. In the rigid-structure support member having a channel section, the distance between the shear center and the bottom side of the channel shape corresponding to the connection plane is smaller if the height of the channel shape and/or the distance between the flanges are reduced.

DESCRIPTION OF THE PREFERRED EMBODIMENTS

Figure 1:
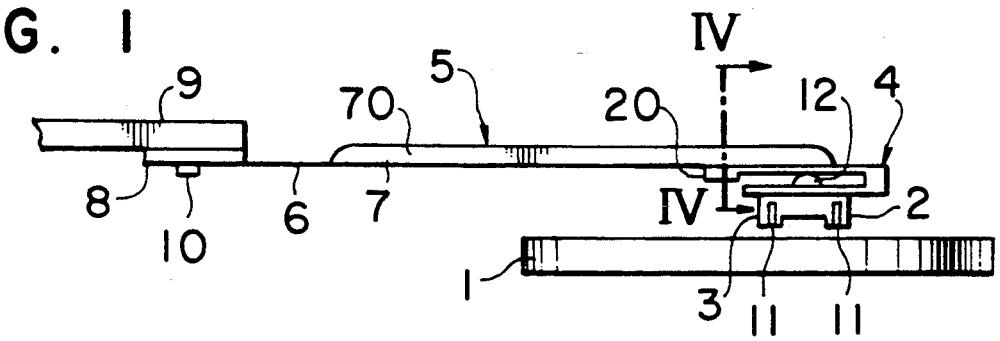
FIG. 1 is a side view of a transducer supporting device which represents a first embodiment of the present invention.

Referring now to the drawings wherein like reference numerals are used throughout the various views to designate like parts and, more particularly, to FIG. 1, according to this figure, a transducer supporting device is attached to a rotary storage unit with a storage medium 1 being rotatably attached to a shaft (not shown).

A rigid-structure support member 5 has a resilient portion 6 formed of, for example, a single stainless strip, and a load beam portion 7 connected to the resilient portion 6. The load beam portion 7 has flanges 70 formed by bending its portions. The rigid-structure support member 5 is integrally formed by, for example, press working and is connected by a screw 10 or by welding to a guide arm 9 at a connection portion 8 located at the end of the resilient portion 6. The guide arm 9 is a rigid arm which is connected to an illustrated accessing mechanism.

A flexible-structure support member 4 is fixedly attached by, for example, welding to the extreme end of the load beam portion 7 of the rigid-structure support member 5, i.e., to a free-end portion of the rigid structure support member 5. To the flexible-structure support 4 is attached an air bearing slider (hereinafter referred to as "slider") 3 which is a transducer mounting means on which a transducer 2 is mounted. A load protrusion 12 is disposed between a slider mount portion 18 of the flexible-structure support member 4 and the rigid-structure support member 5.

Figure 2:
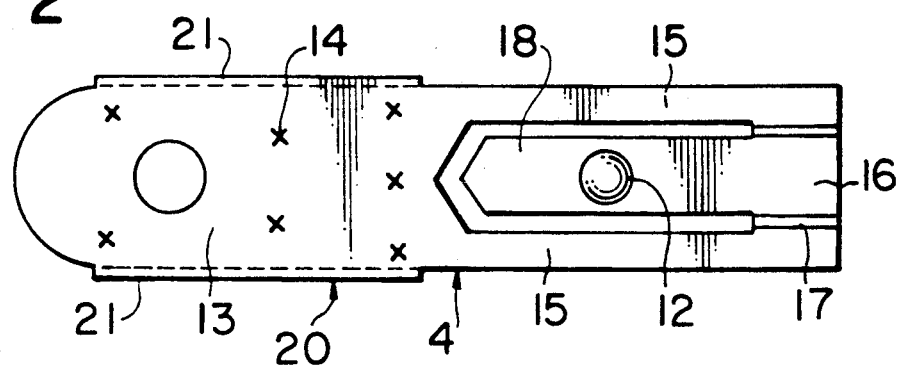
FIG. 2 is a plan view of details of the flexible-structure support member shown in FIG. 1.
Figure 3:
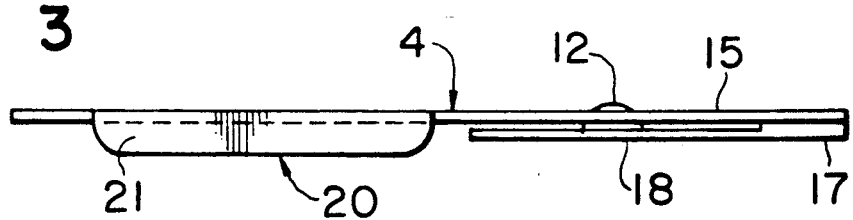
FIG. 3 is a side view of the member shown in FIG. 2.

As shown in FIGS. 2 and 3, the flexible-structure support member 4 has a connection portion 13 connected to the rigid-structure support member 5, flexible extensions 15 in the form of a pair of parallel strips extending from the connection portion 13 so as to be flush with the same, a transverse frame portion 16 which connects the extending ends of the pair of flexible extensions 15 through its stepped portions 17, and the slider mount portion 18 which is a tongue-like member extending from the transverse frame portion 16 in the vicinity of the flexible extensions 15. The connection portion 13 of the flexible-structure support member 4 is connected by spot welding to the rigid-structure support member 5 at spot welding points 14. The connection portion 13 has flanges 21 formed by, for example, bending its two side portions, thereby forming a channel-section member 20. For example, the flexible-support member 4 is formed by etching a single stainless plate, and the the stepped portions 17 and the flanges 21 are formed by press working. The slider mount portion 18 is positioned closer to the storage medium 1 by virtue of the stepped portions 17. The above-described structure achieves certain degrees of freedom of the slider 3 in the rolling and pitching directions when the slider 3 is mounted on the slider mount portion 18.

The slider 3 or the transducer mounting means on which the transducer 2 having floating surfaces 11 is mounted is fixed to the slider mounting portion 18 by an epoxy resin bonding agent or the like, as mentioned above.

The floating surfaces of the slider 3 facing the storage medium 1 enables the slider 3 to be floated or spaced apart from the storage medium 1 by the bearing effect of air films formed between the storage medium 1 and the floating surfaces 11 when the storage medium 1 rotates. This spacing, i.e., the clearance between the slider 3 and the storage medium 1 is very small and ranges from 0.2 to 0.3 $\mu$m. In practice, however, the floating clearance may range from 0.05 to 0.15 $\mu$m in the worst case because the surface of the storage medium 1 has irregularities or roughness of about 0.15 $\mu$m.

The load protrusion 12 transmits a load force from the free end of the rigid-structure support member 5 to the slider mount portion 18. The load protrusion 12 is formed on one of the slider mount portion 18 and the free end of the rigid-structure support member 5. In this embodiment, the load protrusion 12 is provided on the slider mount portion 18 by forming a recess therein.

Figure 4:
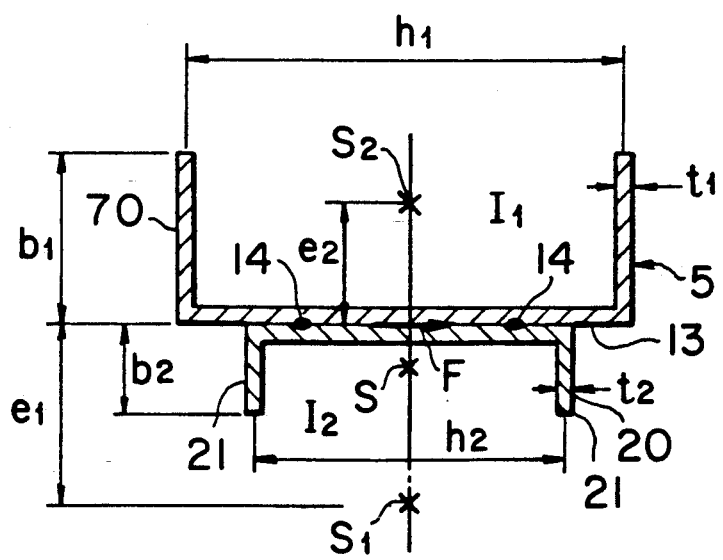
FIG. 4 is a cross-sectional view taken along the line IV—IV of FIG. 1.

In FIG. 4, if the rigid-structure support member 5 vibrates in a in-plane bending mode during seeking, a shearing force F is applied to the connection portion 13. First, the distance $e_1$ between the shear center $S_1$ of the rigid-structure support member 5 and the connection portion 13 is represented by the following equation 1:

$$e_1 = \frac{t_1 b_1^2 h_1^2}{4I_1} \qquad (1)$$

where $I_1$ is a geometrical moment of inertia of the rigid-structure member 5, $t_1$ is the thickness of the flanges 70 of the rigid-structure support member 5, $b_1$ is the height of the flanges 70 and $h_1$ is the distance between the flanges, with: 70.

$$I_1 \approx (\tfrac{1}{2})b_1 t_1 h_1^2 + (1/12) t_1 h_1^3.$$

The shear center $S_1$ is defined as a point such that if a shearing force is applied to the object through this point, no torsion of the object takes place. The shear center $S_1$ of the rigid-structure support member 5 is at the distance $e_1$ from the connection portion 13. In other words, if the shearing force F is applied to the connection portion 13, the rigid-structure support member 5 is twisted for $e_1$ by the shearing force F and thereby receives an angular moment.

Next, if the flexible-structure support member 4 is provided with the channel-section member 20, the distance $e_2$ between the shear center $S_2$ of the channel-section member 20 and the connection portion 13 is similarly represented by the following equation 1:

$$e_2 = t_2 b_2^2 h_2^2 / 4I_2 \qquad (2)$$

where $I_2$ is a geometrical moment of inertia of the flexible-structure member 4, $t_2$ is the thickness of the flanges 21 of the flexible-structure support member 4, $b_2$ is the height of the flanges 21 and $h_2$ is the distance between the flanges 21.

The shear center $S_2$ is located on the side of the connection portion 13 remote from the shear center $S_1$, and the flexible-structure support member 4 is subjected to a torsion in the direction opposite to that of the torsion of the rigid-structure support member 5. The channel-section member 20 acts to reduce the torsion of the rigid-structure support member 5. Thus, the channel-section member 20 serves to bring the overall shear center closer to the connection surface. That is, the overall shear center S can be brought closer to the connection portion 13 by selecting suitable values of the parameters of equations (1) and (2). In this embodiment, the value of $e_1$ is reduced from about 0.3 mm, which is an ordinary value in the case of the conventional arrangement, to about 0.1 mm. As a result, the torsion is reduced and the angular moment caused by the torsion is limited to a smaller value, thereby reducing variations in the slider floating clearance. The provision of the channel-section member enables the rigidity of the rigid-structure support member 5 to be improved, thereby shifting primary and secondary modes of out-of-plane bending, torsion and in-plane bending to higher-frequencies.

In this embodiment, shaking forces caused by disturbances of air flows due to separation at the flanges 21 are cancelled and changes in the floating clearance due to air flow disturbances are limited.

Figure 5:
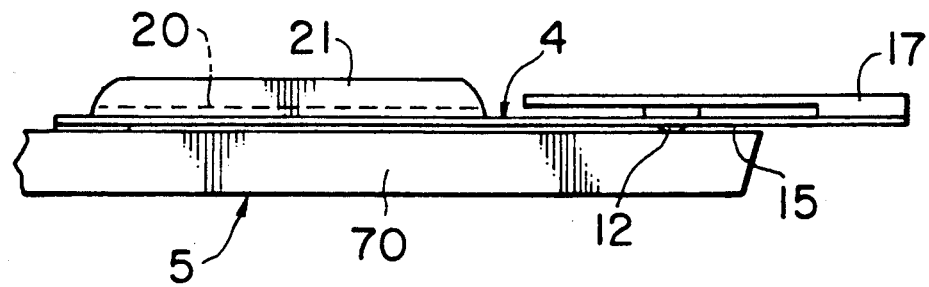
FIG. 5 is a side view of a second embodiment of the present invention.
Figure 6:
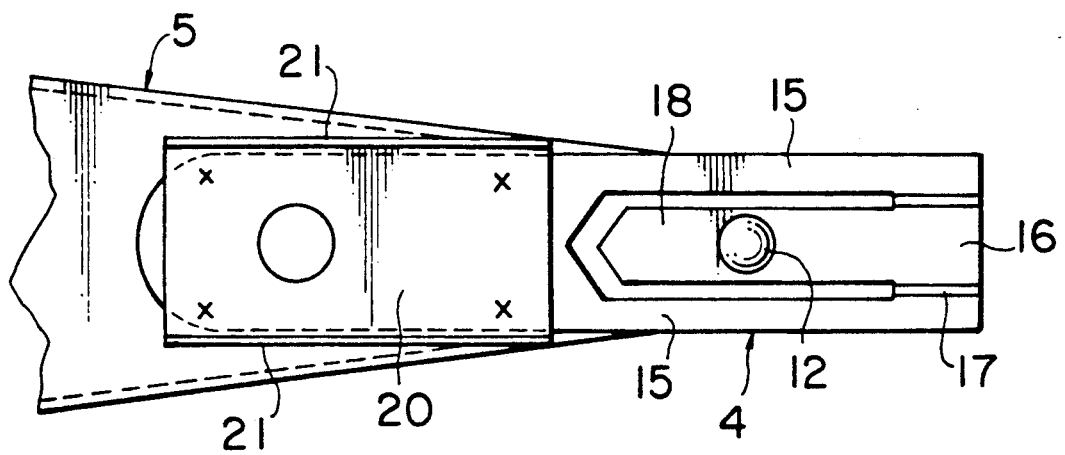
FIG. 6 is a plan view of the second embodiment.

In the embodiment of FIGS. 5 and 6, the flexible-structure support member 4 is connected to the rigid-structure support member 5 while being interposed between the rigid-structure member 5 and the channel-section member 20 having flanges 21. These members are connected by, for example, spot welding. Because, the channel-section member is provided separately from the flexible structure member, the thickness and the shape of the channel-section member can be selected as desired. Other effects of this construction are similar to those in the first embodiment.

In the embodiment shown in FIG. 1, the slider 3 is mounted in such a manner that the center line of the floating rails of the slider 3 is perpendicular to the longitudinal center axis of the rigid-structure support member 5. However, the present invention can be applied in the same manner to an in-line type of transducer supporting device in which the center line of the floating rails of the slider 3 is parallel to the longitudinal center axis of the rigid-structure support member 5.

Figure 7:
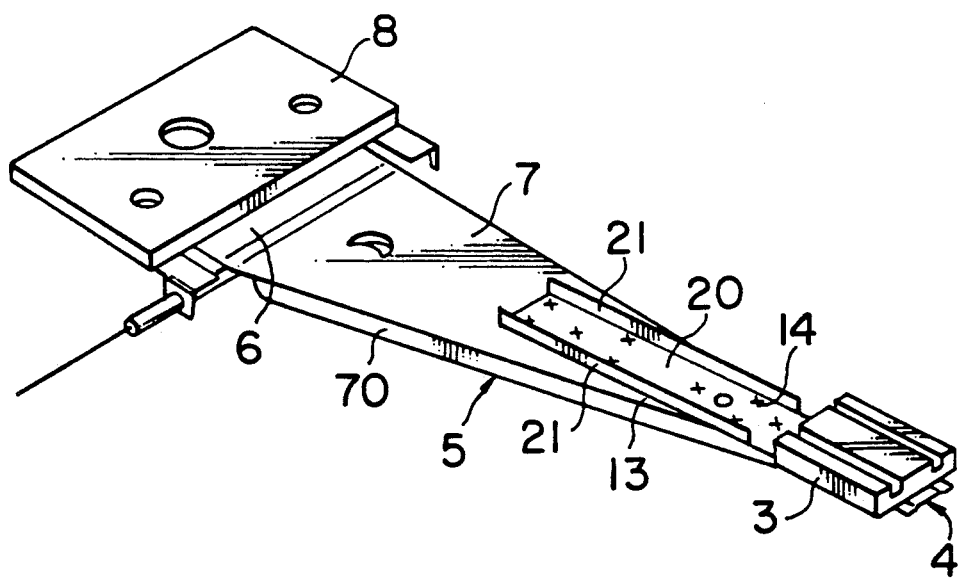
FIG. 7 is a perspective view of a third embodiment of the present invention.

FIG. 7 shows a third embodiment of the present invention which exemplifies application of the present invention to an in-line type of transducer supporting device. In the embodiment of FIG. 7, the channel-section member 20 which constitutes the connection portion 13 of the flexible-structure support member 4 is extended along the center axis of the rigid-structure support member 5 in the direction of the resilient portion 6. This embodiment has the same effects as the first embodiment while the rigidity of the rigid-structure support member 5 is further improved compared with the first embodiment. Specifically, the frequencies of secondary-mode natural vibrations of out-of-plane bending and in-plane bending can be increased. Because the area of the connection portion 13 can be increased in this embodiment, connections based on spot welding between the connection portion and the rigid-structure support member may be increased to obtain damping effects based on attenuation due to friction between these members. In this embodiment, the connection portion 8 is disposed on the rigid-structure support member 5 to reduce the overall height of the transducer supporting device. However, the ordinary type of structure can also be applied to this connection.

Figure 8:
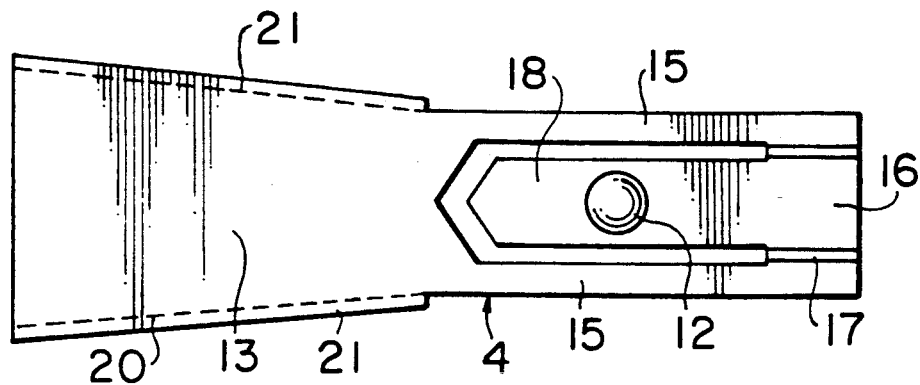
FIG. 8 is a plan view of the flexible-structure support member in accordance with a fourth embodiment of the present invention.
Figure 9:
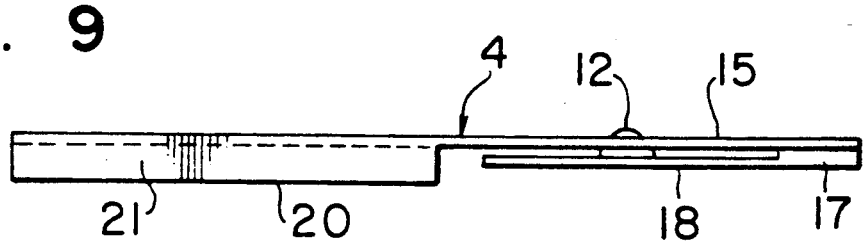
FIG. 9 is a side of the member shown in FIG. 8.

In the embodiment of FIGS. 8 and 9, the channel-section member 20 formed at the connection portion 13 of the rigid-structure support member 5 for connection to the flexible-structure support member 4 has its width in the direction perpendicular to the longitudinal direction of the flexible-structure support member 4 reduced on the side of flexible extensions 15. The load beam portion 7 of the rigid-structure support member 5 to which the flexible-structure support member 4 is connected through the connection portion 13 is reduced in width on the side of it extreme end, i.e., on the side of the connection portion 13 of the flexible-structure support member 4, although this structure is not illustrated. The relationship between the shear center and the force applied to the connection portion is explained in the above with respect to a transverse cross section of the connection portion 13, but, strictly speaking, the torsion at the connection portion 13 appears as a total sum of torsions from the root end on the side of the accessing mechanism to the connection portion 13. The rigid-structure support member 5 has a thin structure, and I1 can be expressed as in accordance with the following equation:

$$I_1 = \frac{1}{2} b_1 t_1 h_1^2 + \frac{t_1 h_1^3}{12},$$

while omitting terms of higher orders. The distance $e_1$ between the shear center $S_1$ and the connection portion 13 is therefore expressed as follows by modifying equation (1) as follows:

$$e_1 = \frac{b_1}{2 + \frac{h_1}{3b_1}} \tag{3}$$

where $e_1$ is determined by the distance $b_1$ between the flanges and the height $h_1$ of the flanges and changes with respect to the location on the load beam portion 7. However, it is possible to limit the distance $S_1$ to a generally constant value from the extreme end of the connection portion to the root end by setting the change in the width of the channel-section member 20 of the flexible-structure support member in accordance with the change in the width of the load beam portion 7.

Figure 10:
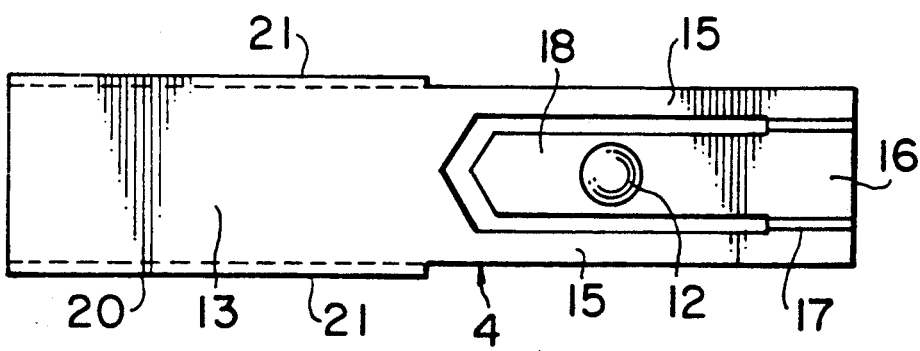
FIG. 10 is a plan view of a fifth embodiment of the present invention.
Figure 11:
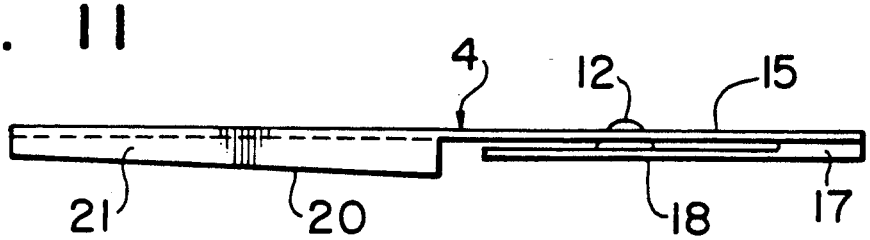
FIG. 11 is a side view of the fifth embodiment.
Figure 12:
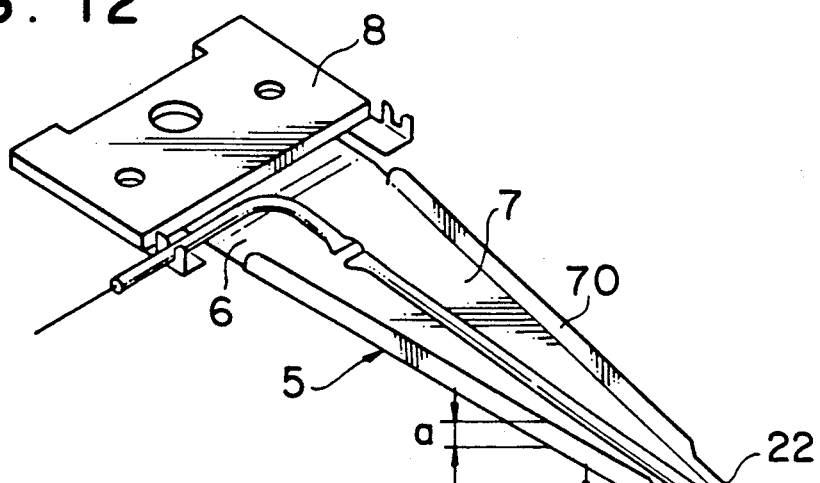
FIG. 12 is a perspective view of a fifth embodiment of the present invention.

In accordance with the embodiment of FIGS. 10 and 11, an arrangement in which the height of the flange portions 21 of the channel-section member 20 is changed is adopted as a means of changing the distance $e_1$ of the channel-section member 20 connected to the load beam portion 7, where the distance $e_1$ changes with respect to the location as in the case of the fourth embodiment, in accordance with the change in $e_1$ over the load beam portion 7 so as to reduce the distance $S_1$ combined from these distances. This embodiment also attains the same effects as the fourth embodiment. In the embodiment of FIG. 12, cutout portions 22 are provided as a means of bringing the shear center in a transverse cross section at the connection portion 13 of the flexible-structure support 4 closer to the connection portion 13. The cutout portions 22 are formed by changing the height of the flanges of the load beam portion 7 of the rigid-structure support member 5 in such a manner that the height of flange portions located at a region in which the connection portion 13 is included is smaller than the height a of the other portions. As can be understood from equation (3) the distance $e_1$ between the shear center and the connection portion is also reduced by reducing the height of the flanges. Therefore this embodiment is as effective as the first embodiment. As long as the size of the cutout portions of the flanges is limited, the vibration characteristics of the rigid-structure support member 5 are scarcely impaired.

Figure 13:
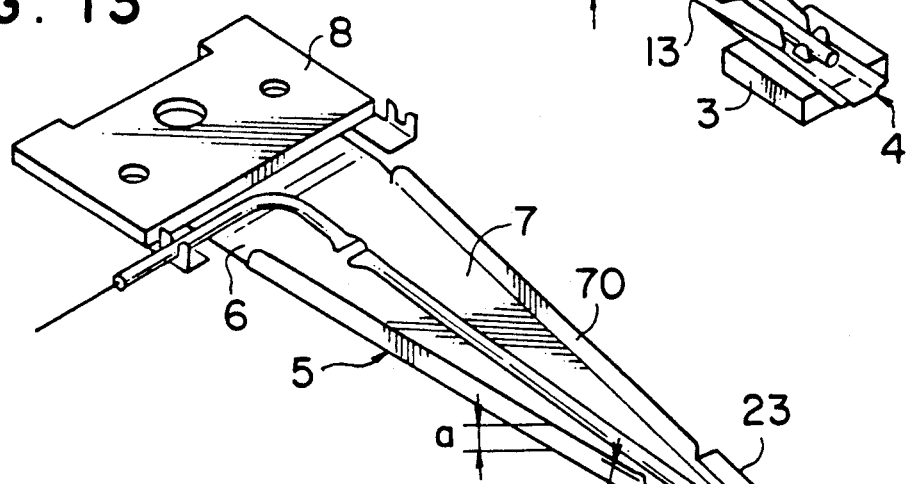
FIG. 13 is a perspective view of a seventh embodiment of the present invention.

In accordance with the embodiment of FIG. 13, an arrangement in which the flanges of the load beam portion 7 of the rigid-structure support member 5 are partially bent is adopted as a means of bringing the shear center in a transverse cross section at the connection portion 13 of the flexible-structure support 4 closer to the connection portion 13. In this arrangement, only flange portions located at a region in which the connection portion 13 is included are bent so as to extend outward by j so that their height is substantially smaller than the height of the other portions, thereby forming bent portions 23. This arrangement is as effective as the method of providing cutout portions and enables the torsional rigidity of the corresponding portion to be increased, thereby reducing deformations thereof and, hence, changes in the floating clearance.

Figure 14:
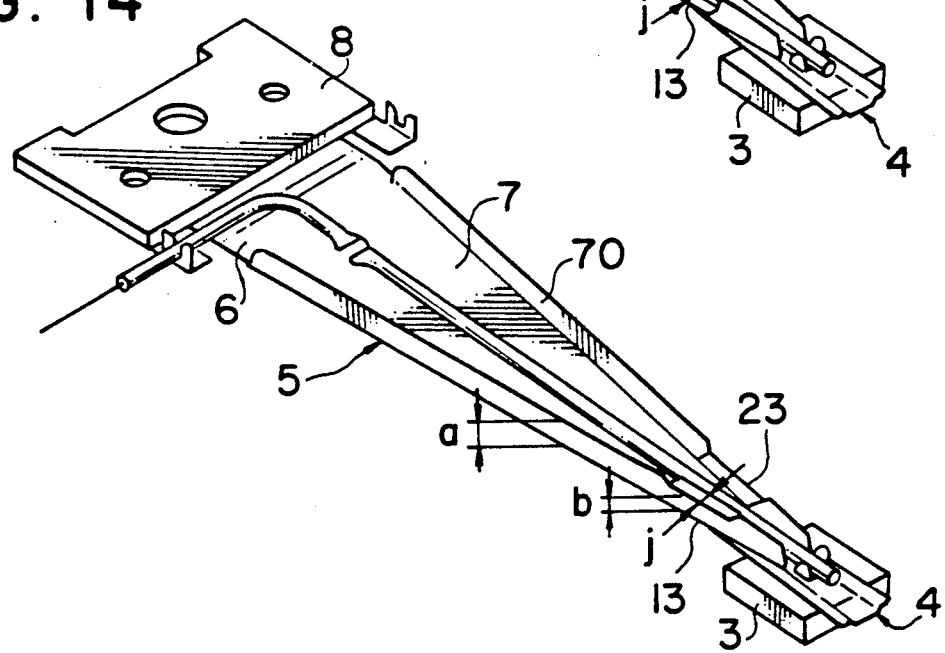
FIG. 14 is a perspective view of an eighth embodiment of the present invention.
Figure 15:
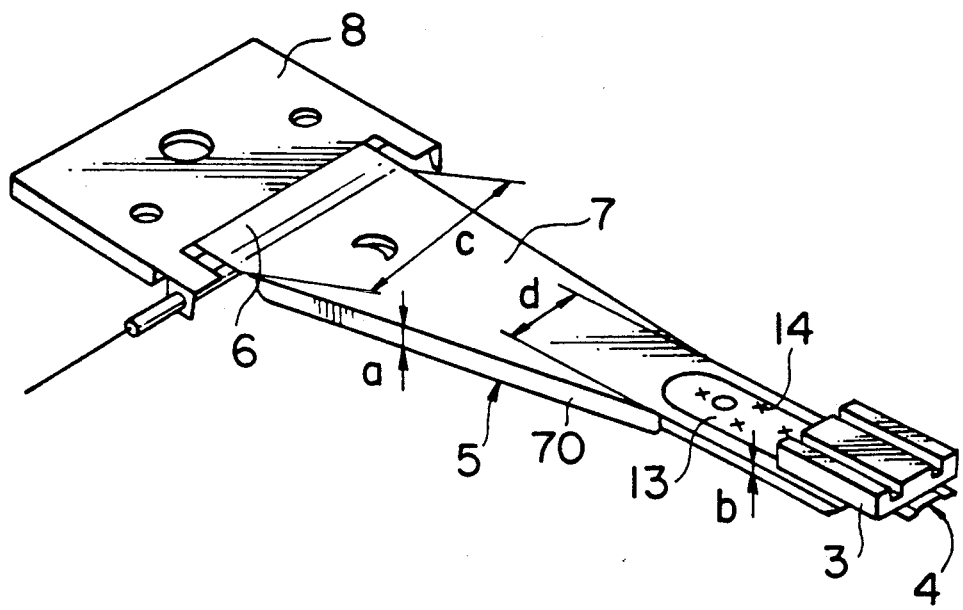
FIG. 15 is a perspective view of a ninth embodiment of the present invention.

In the embodiment of FIG. 14 flange portions corresponding to the flange portions of the embodiment of FIG. 13 that are bent outward are bent so as to extend inward by j. This embodiment attains the same effects as the seventh embodiment. In the embodiment of FIG. 15, the load beam portion 7 of the rigid-structure support member 5 is formed in such a manner that the width of its portion on the side of the resilient portion 6 or the distance between the side flanges gradually decreases from at the connection to the resilient portion 6 while the width of its other portion located at an extreme end region in which the connection portion 13 connected to the flexible-structure member 4 is included is which is generally constant, and that the height of the flanges of the portion having its width gradually reduced is higher than the height b of the flanges of the constant-width portion.

The shear center is brought closer to the connecting portion 13 by reducing the height b, and a reduction in the torsional rigidity of the rigid-structure support member 5 is compensated by increasing the distance d between between the flanges. This arrangement is therefore effective in reducing changes in the floating clearance during seeking.

Figure 16:
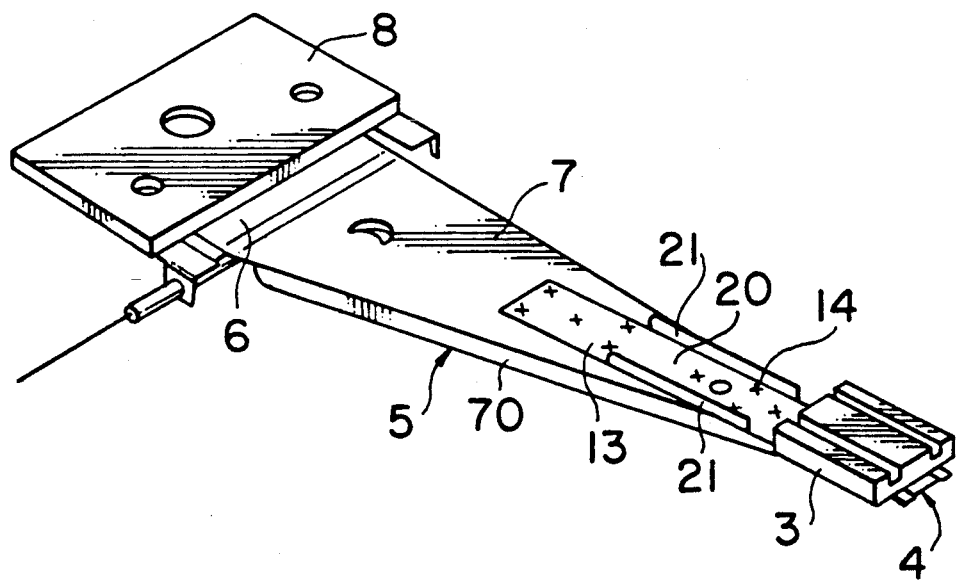
FIG. 16 is a perspective view of a tenth embodiment of the present invention.

For instance, if the height of the flanges is reduced by half while the distance between the flanges at the connection portion 13 is increased by 30%, the variation of the floating clearance due to pitching of the slider 3 is reduced to about ½. In the embodiment of FIG. 16, the flanges 21 are provided on a portion of the connection portion 13 of the flexible-structure support member 4 on the side of the slider 3 alone and no flanges are formed on the other portion on the side of the load beam portion 7. The concept of this embodiment resides in that the flanges of the flexible-structure support member are partially removed at a section of the connection portion 13 connected to the rigid-structure support member on the side of the load beam portion 7, where the torsional rigidity is comparatively large.

Figure 17:
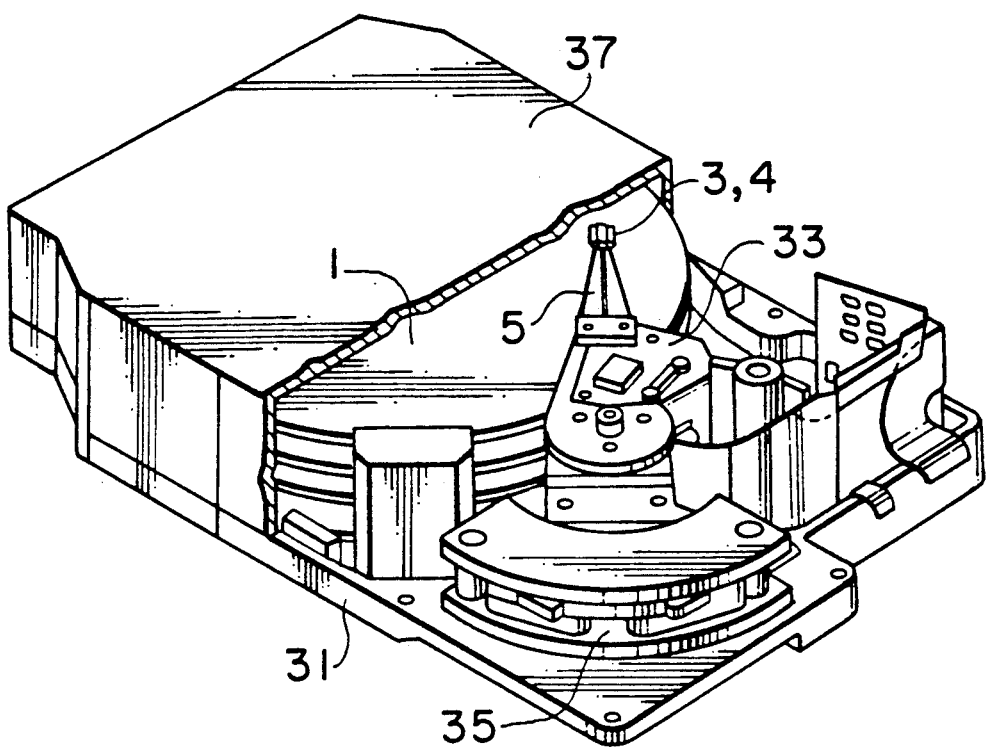
FIG. 17 is a partially cutaway perspective view of an eleventh embodiment of the present invention.

In FIG. 17 an in-line type rotary disk storage unit is provided which incorporates a transducer supporting device in accordance with the present invention. The rigid-structure support member 5 connected to a carriage 33 and the flexible-structure support member 4 with the slider 3 mounted on the rigid-structure support member 5 are illustrated. According to this embodiment, the slider floating clearance can be reduced because the variation of the slider floating clearance is smaller, thereby realizing high-density storage on the storage medium.

Figure 18:
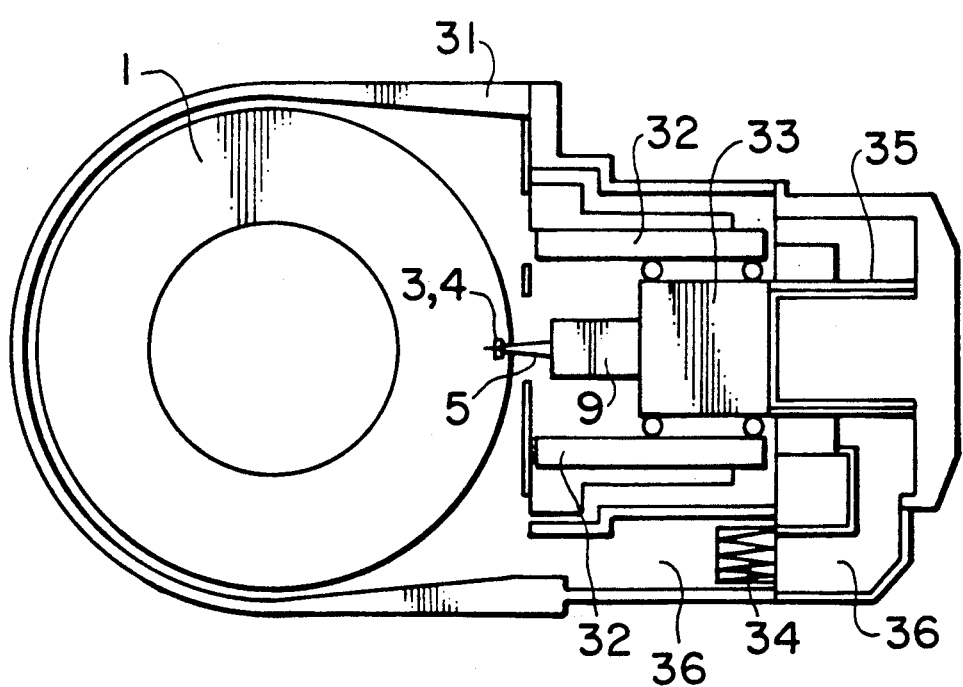
FIG. 18 is a plan view of a twelfth embodiment of the present invention.

FIG. 18 provides an example of a linear type rotary disk storage unit which incorporates a transducer supporting device in accordance with the present invention. The guide beam 9 is connected to the carriage 33, the rigid-structure support member 5 is connected to the guide beam 9, and the flexible-structure support member 4 and the slider 3 are attached to the extreme end of the rigid-structure support member 5. The slider 3 is driven by a voice coil motor 35 to advance or retreat in the radial direction of the rotary disk storage medium 1. This embodiment attains the same effects as the the embodiment illustrated in FIG. 17.

In accordance with the present invention, as described above, torsions caused on the transducer supporting device during seeking and, hence, changes in the floating clearance for the transducer mounting means are controlled thereby improving the reliability of the storage unit while enabling the set floating clearance to be reduced. It is thereby possible to increase the density of memory on the storage medium and, hence, the memory capacity.

What is claimed is:

1. A device for supporting a transducer, comprising:
  a rigid-structure support member having a resilient portion and a load beam portion connected to said resilient portion;
  a flexible-structure support member connected to said load beam portion while overlapping the same; and
  a transducer mounting means attached to said flexible-structure support member;
  wherein both said flexible-structure support member and said rigid-structure support member are formed of a channel-section member having a flattened U-shaped cross-section perpendicular to a longitudinal axis of said flexible-structure and rigid-structure support members at an area of the overlapping, with open ends of said channel-section members facing away from each other.

* * * * *